United States Patent [19]

Levey

[11] Patent Number: 5,398,300
[45] Date of Patent: Mar. 14, 1995

[54] NEURAL NETWORK HAVING EXPERT SYSTEM FUNCTIONALITY

[75] Inventor: Curt A. Levey, San Diego, Calif.
[73] Assignee: HNC, Inc., San Diego, Calif.
[21] Appl. No.: 814,179
[22] Filed: Dec. 30, 1991

Related U.S. Application Data

[63] Continuation-in-part of Ser. No. 558,755, Jul. 27, 1990, abandoned.

[51] Int. Cl.$^6$ ............................................. G06F 15/18
[52] U.S. Cl. ........................................ 395/22; 395/76
[58] Field of Search ................ 395/20, 21, 22, 51, 395/61, 75, 76, 11, 23

[56] References Cited

U.S. PATENT DOCUMENTS

| | | | |
|---|---|---|---|
| 4,730,259 | 3/1988 | Gallant | 364/513 |
| 5,014,219 | 5/1991 | White | 364/513 |
| 5,140,523 | 8/1992 | Frankel et al. | 364/420 |
| 5,140,530 | 8/1992 | Guha et al. | 395/13 |
| 5,164,912 | 11/1992 | Osborne et al. | 364/580 |
| 5,253,328 | 10/1993 | Hartman | 395/24 |

OTHER PUBLICATIONS

McClelland et al., Explorations in Parallel Distributed Processing, MIT Press, 1988, 145–152.
Sietsma et al., "Neural Net Pruning—Why and How", IEEE Intl. Conf. on Neural Networks, Jul. 1988, I-325-I-333.
Gallant et al., "A Neural Network Expert System with Confidence Measurements", Proc., Third Intl. Conf. on Information Processing and Management of Uncertaintly in Knowledge-based Systems, Jul. 1990, 562–567.
Caudill, M., "Using Neural Nets: Making an Expert Network", AI Expert, Jul. 1990, 41–45.
Dolan, C., et al., "Towards the Evolution of Symbols", Proceedings of 2nd Intl. Conf. on Genetic Algorithms, Jul. 1987, 123–131.
Gallant, S., "Connectionist Expert Systems", Communications of the ACM, Feb. 1988, 152–169.
Gallant, S., "Example-Based Knowledge Engineering with Connectionist Expert Systems", Proceedings IEEE Midcon, Aug. 30-Sep. 1, 1988, 32–37.
Hecht-Neilsen, R., "Combinatorial Hypercompression", Proceedings of the IEEE First Intl. Conf. on Neural Networks, Jun. 1987, II 455-II 461.
Hecht-Neilsen, R., "Performance Limits of Optical, Electro-Optical, and Electronic Neurocomputers", SPIE Proceedings, 1986, 1–45.
McClelland, J., et al., Explorations in Parallel Distributed Processing, MIT Press, 1988, 2, 3, 137–143.
Parsaye, K., et al., Expert Systems for Experts, Chapt. 6, "Uncertainty", John Wiley & Sons, 1988, 211–249.
Vendor's Forum, "KnowledgeNet HNC's Neural Net/Expert System Symbrosis", PC AI, Sep./Oct. 1990, 40–43.
"KnowledgeNet", advertising brochure by HNC, Inc., Jan. 1991.
"ExploreNet 3000", advertisting brochure by HNC, Inc., Jun. 1991.
HNC KnowledgeNet Manual for Release 2.11, Sep. 1991.
McClelland, et al., Explorations in Parallel Distributed Processing, MIT Press, 1988, 130–136.
Caudill, M., "Using Neural Nets: Representing Knowledge", AI Expert, Dec. 1989, 34–41.
Hillman, D. V., "Integrating Neural Nets and Expert Systems", AI Expert, Jun. 1990, 54–59.
Bailey, et al., "Developing Neural-Network Applications", AI Expert, Sep. 1990, 34–41.

(List continued on next page.)

Primary Examiner—Robert W. Downs
Attorney, Agent, or Firm—Albert C. Smith; Edward J. Radlo; Judson D. Cary

[57] ABSTRACT

A method for performing a variety of expert system functions on any continuous-state feedforward neural network. These functions include decision-making, explanation, computation of confidence measures, and intelligent direction of information acquisition. Additionally, the method converts the knowledge implicit in such a network into a set of explicit if-then rules.

13 Claims, 12 Drawing Sheets

OTHER PUBLICATIONS

Caudill, M., "Using Neural Nets: Diagnostic Expert Nets", AI Expert, Sep. 1990, 43–47.

Caudill, M., "Using Neura Nets: Hybrid Expert Networks", AI Expert, Nov. 1990, 49–54.

Garson, G. D., "Interpreting Neural-Network Connection Weights", AI Expert, Apr. 1991, 47–51.

Davis, G. W., "Sensitivity Analysis in Neural Net Solutions", IEEE Trans. on Syst., Man, and Cybernetics, Sep./Oct. 1989, 1078–1082.

Peng, et al., "Conceptual Approach to the Applicantion of Neural Network for Short-Term Load Forecasting", 1990 IEEE Intl. Symp. on Circuits and Systems, May 1990, 2942–2945.

Karnin, E. D. "A Simple Procedure for Pruning Back-Propagation Trained Neural Networks", IEEE Trans. on Neural Networks, Jun. 1990, 239–242.

Chow, et al., "Robustness Test of an Incipient Fault Detector Artificial Neural Network", IJCNN-91, Jul. 1991, I-73 to I-78.

Xu, et al., "Optimum Frequencies Selection for Radar Target Classification by Neural Network", 1991 IEEE Intl. Joint Conf. on Neural Networks, Nov. 1991, 1236–1241.

Samad, T., "Towards Connectionist Rule-Based Systems", IEEE Intl. Conf. on Neural Networks, Jul. 1988, II-525 to III-532.

Bochereau, et al., "Rule Extraction and Validity Domain on a Multilayer Neural Network", IJCNN, Jun. 1990, I-97 to I-100.

Baba, et al., "Explicit Representation of Knowledge Acquired from Plant Historical Data Using Neural Network", IJCNN, Jun. 1990, III-155 to III-160.

McMillan, et al., "Learning Explicit Rules in a Neural Network", IJCNN, Jul. 1991, II-83 to II-88.

Enbutsu, et al., "Fuzzy Rule Extraction from a Multilayered Neural Network", IJCNN, Jul. 1991, II-461 to II-465.

Kowalczyk, et al., "Discovering Production Rules with Higher Order Neural Networks: a Case Study II", IJCNN, Nov. 1991, 547–553.

Furuta, et al., "A Fuzzy Expert System for Durability Assessment of Bridge Decks", Proc. First Intl. Symp. on Uncertainty Modeling and Analysis, Dec. 1990, 522–527.

Klimasauskas, C. C., "Neural Nets Tell Why", Dr. Dobbs's Journal, Apr. 1991, 16–24 (16, 18, 20, 22, 24).

'?' indicates a missing value.
'Accounts' refers to sources of credit such as loans and credit cards.

| VARIABLE NAME | APPLICANT'S VALUES |
|---|---|
| Active Accounts (# of accounts currently open) | 1 |
| New Accounts (# of accounts opened in the last 18 months) | 0 |
| # of Inquiries (# of inquiries made into applicant's credit history in the last 6 months) | 2 |
| Public Record Items (# of derogratory items in the credit report, e.g., bankruptcies and tax liens) | 0 |
| Bankcard Accounts (# of bank credit cards listed as credit references) | 1 |
| Retail Accounts (# of retail store credit cards listed as credit references) | ? |
| 30-Days Overdue Now (# of accounts for which payment is currently 30 or more days overdue) | 0 |
| 90-Days Overdue Ever (# of accounts for which payment has ever been 90 or more days overdue) | 0 |
| % Ever 60-Days Overdue (percentage of accounts for which payment has ever been 60 or more days overdue) | 0.0 |
| Applicant's Age (age in years) | 40 |
| Time at Address (months at current home address) | 276 |
| Time at Job (months at present job) | ? |
| Time in Credit File (months in credit-reporting agency's file) | 25 |

FIGURE. 7

| VARIABLE | VALUE | CONTRIBUTION TO LOAN APPROVAL |
|---|---|---|
| SUPPORTING FACTORS: | | |
| New Accounts | 0 | 100.0 |
| 30-Days Overdue Now | 0 | 49.8 |
| % Ever 60-Days Overdue | 0.0 | 34.9 |
| 90-Days Overdue Ever | 0 | 24.0 |
| INSIGNIFICANT FACTORS: | | |
| Bankcard Accounts | 1 | 18.8 |
| Time at Address | 276 | 13.6 |
| Public Record Items | 0 | 5.3 |
| Applicant's Age | 40 | 5.1 |
| Active Accounts | 1 | -1.2 |
| # of Inquiries | 2 | -6.7 |
| WEAKENING FACTORS: | | |
| Time in Credit File | 25 | -49.7 |

FIGURE.8

| VARIABLE | VALUE | CONTRIBUTION TO LOAN APPROVAL |
|---|---|---|
| SUFFICIENT: | | |
| 30-Days Overdue Now | 0 | 100.0 |
| # of Inquiries | 2 | 96.3 |
| Bankcard Accounts | 1 | 78.0 |
| New Accounts | 0 | 65.6 |
| Active Accounts | 1 | 54.2 |
| % Ever 60-Days Overdue | 0.0 | 44.7 |
| Public Record Items | 0 | 33.1 |
| 90-Days Overdue Ever | 0 | 25.8 |
| Time at Address | 276 | 20.9 |
| Applicant's Age | 40 | 17.7 |
| ADDITIONAL: | | |
| Time in Credit File | 25 | 3.3 |

FIGURE.9

| VARIABLE | INFLUENCE |
|---|---|
| Bankcard Accounts | 100.0 |
| Time at Job | 96.5 |
| Retail Accounts | 62.9 |
| Applicant's Age | 50.6 |
| Time at Address | 31.7 |

FIGURE.10

IF New Accounts=LOW

AND 30-Days Overdue Now=LOW

AND % Ever 60-Days Overdue=LOW

AND Active Accounts=MEDIUM

AND Bankcard Accounts = HIGH

AND Time at JOB=HIGH

CONCLUDE Approve =TRUE

FIGURE.11

NEURAL NETWORK HAVING EXPERT SYSTEM FUNCTIONALITY

This application is a continuation-in-part of U.S. patent application Ser. No. 558,755, filed Jul. 27, 1990, now abandoned.

FIELD OF THE INVENTION

This invention relates to neural networks and more particularly to a class of neural networks known as continuous-state feedforward neural networks.

BACKGROUND OF THE INVENTION

Neural networks are composed of a series of interconnected neuron-like processing elements (PEs). The strengths of the connections between PEs are represented by weights. Each PE stores a value known as a state, which is either specified by input data or computed from the PE's inputs and weights, using its transfer function. Typically, the transfer function is applied to the PE's net-input, the weighted sum of its inputs. Collectively, states are used to represent information in the short term. Long-term information or learning is represented by the weights. Neural networks learn from examples by modifying their weights. Once learning or training is completed, these networks can perform a variety of computational tasks.

Much of the use of neural networks is focused on feedforward networks. These networks have an architecture consisting of a layer of input nodes, a layer of output nodes, and optionally, some number of hidden layers in between. Input data is represented using the states of the input layer. The network's response to that data is represented by the states of the output layer. The feedforward nature of these networks results from the fact that, during an iteration, the computations flow from the input layer, through any hidden layers, to the output layer. This architecture allows the network to learn to map input states to output states approximating the correct response to the input. For example, if the input states represent the symptoms presented by a medical patient, the network is able to produce output states representing an estimation of the correct diagnosis for those symptoms.

One of the hindrances to wider acceptance of neural networks is the fact that they function largely as black boxes. It is often difficult to understand why a specific set of inputs produced a particular output. This difficulty is a result of the fact that the network's 'knowledge' is encoded in the weights associated with a complex web of interconnections. It is desirable to find an explanation method for neural networks that is a way to explain a particular output in terms of the network inputs. For example, if a network is used to make loan decisions, it would be desirable to explain those decisions in terms of the input data describing the applicant. An explanation of this kind is required for negative loan decisions.

The black box problem is not as serious for two-layer feedforward networks, i.e., those without hidden layers. In these networks, the relationship between the inputs and outputs is straightforward. The magnitude and direction of the relationship between the states of an input PE and an output PE are given by the weight of the connection between the two PEs. Because the relationship between each input and output is fixed, these simple networks cannot capture variable relationships between input and outputs, such as non-monotonic relationships. Nor can they capture the interdependencies among inputs. That is to say, they cannot implement mappings in which the effect of some input on some output is dependent on the values of other inputs. They can learn only linear mappings, i.e., mappings where each output is proportional to a weighted sum of the inputs. Thus these networks are restricted to learning only a limited subset of the relationships that exist in the real world.

Networks with hidden layers are needed to learn nonlinear mappings, including non-monotonic relationships between inputs and outputs and interdependencies among inputs. Since there is no straightforward relationship between inputs and outputs in these networks, explanation is a difficult problem. One attempt at explanation uses sensitivity analysis. This technique involves changing the value of an input, iterating the network, and noting whether there is any meaningful change in the network's output. Using the medical domain as an example again, sensitivity analysis would involve changing one of the input symptoms and noting whether there is a change in the network's diagnostic output.

Explanation is also an issue in the field of expert systems. These systems are often compared to neural networks because the two technologies attempt to solve some of the same problems, namely: classification; prediction; and decision-making. Explanation is more straight-forward in expert systems than in neural networks, because the 'knowledge' in an expert system is more explicit in that it is contained in a set of if-then rules known as a rulebase. In addition to explanation, expert systems possess other desirable capabilities not found in neural networks of the prior art. These capabilities include the ability to determine when enough input information is present to make conclusions; to provide intelligent direction to the user's information acquisition; and to calculate confidence measures to accompany decisions.

Unfortunately, expert systems lack the ability to learn from examples, which is the most appealing feature of neural networks. Although some attempts have been made to imbue expert systems with a learning capability, they still rely primarily on handcrafted rules as their source of 'knowledge'. Thus, building an expert system to solve a particular problem requires finding a human expert in the problem domain, translating his knowledge into if-then rules, then debugging the rulebase.

Clearly, it is desirable to combine the learning ability of neural networks with the explanation and other capabilities of expert systems. One known attempt at such a combination involves an expert system which uses a neural network as its source of 'knowledge', and is thus able to take advantage of neural network learning. In addition to expert system capabilities such as explanation, this hybrid system includes an optional facility for converting the knowledge contained in the network into a set of rules. This system is described in the literature (see, for example, U.S. Pat. No. 4,730,259).

Unfortunately, the techniques used in this hybrid system of the prior art have several important limitations. Most significantly, they are applicable only to perceptron networks, also known as linear discriminant networks. With the possible exception of the input layer, the PEs of these networks are limited to tertiary states, i.e., there are only three possible state values, corresponding roughly to TRUE, FALSE, and unknown. The result is that perceptron networks cannot compute mappings as precisely as continuous-state networks, i.e., networks whose states are not limited to a set of discrete values. Even more important than the loss of precision is the fact that perceptron networks cannot be trained with backpropagation learning, which is the most popular training method for networks with hidden layers.

The explanation techniques of the prior art hybrid system also have limitations. For example, explanations can be generated only for conclusions since there is no method for explaining why the system is leaning toward one output or another prior to a definitive conclusion. Explanations take the form of rules, with the conditions (inputs or hidden layer states) on the left-hand side of the rule serving as an explanation for the conclusion on the right-hand side. Those conditions included in the rule make a larger positive contribution to the conclusion than those omitted. However, no precise measurement of contributions is produced for either the included or omitted conditions.

The prior art hybrid system is also limited in the way in which it directs the user's information acquisition. The system chooses a single input whose value is unknown but important and asks the user to give a value for that input. However, the system provides no information about the relative importance of the other unknown inputs.

SUMMARY OF THE INVENTION

Accordingly, the present invention is a system which allows expert system functionality, including explanation, to be added to feedforward neural networks. The invention overcomes the deficiencies in the prior art. In particular, the present invention overcomes the deficiencies in the existing technology for continuous-state, feedforward networks in that it can determine when enough input information is present to make conclusions; it can precisely explain its decisions and why some of those decisions become conclusions; it can calculate confidence measures to accompany its decisions; and it can compute the relative importance of the inputs with unknown values. The present invention is different from existing expert system technology because it can learn from examples, rather than relying on humans to give it knowledge in the form of rules. Explanation in the present invention is different from the existing technology for explanation in two-layer networks because the invention handles nonlinear relationships. The present invention is different from the hybrid system of the prior art because it overcomes the deficiencies in that system; for example, the invention operates on the powerful class of continuous-state feedforward networks.

DESCRIPTION OF THE DRAWINGS

FIG. 7 is a description of the thirteen input variables in the loan-scoring problem, along with sample values, in the operation illustrated in FIG. 6;

FIG. 8 is an example of output for Decision Explanation in the loan-scoring problem illustrated in FIGS. 6 and 7;

FIG. 9 is an example of output for Conclusion Explanation in the loan-scoring problem illustrated in FIGS. 6 and 7;

FIG. 10 is an example of output for Intelligent Knowledge Acquisition in the loan-scoring problem illustrated in FIGS. 6 and 7;

FIG. 11 is an example of output for Rule Generation in the loan-scoring problem illustrated in FIGS. 6 and 7.

DESCRIPTION OF THE PREFERRED EMBODIMENTS

Figure 1:
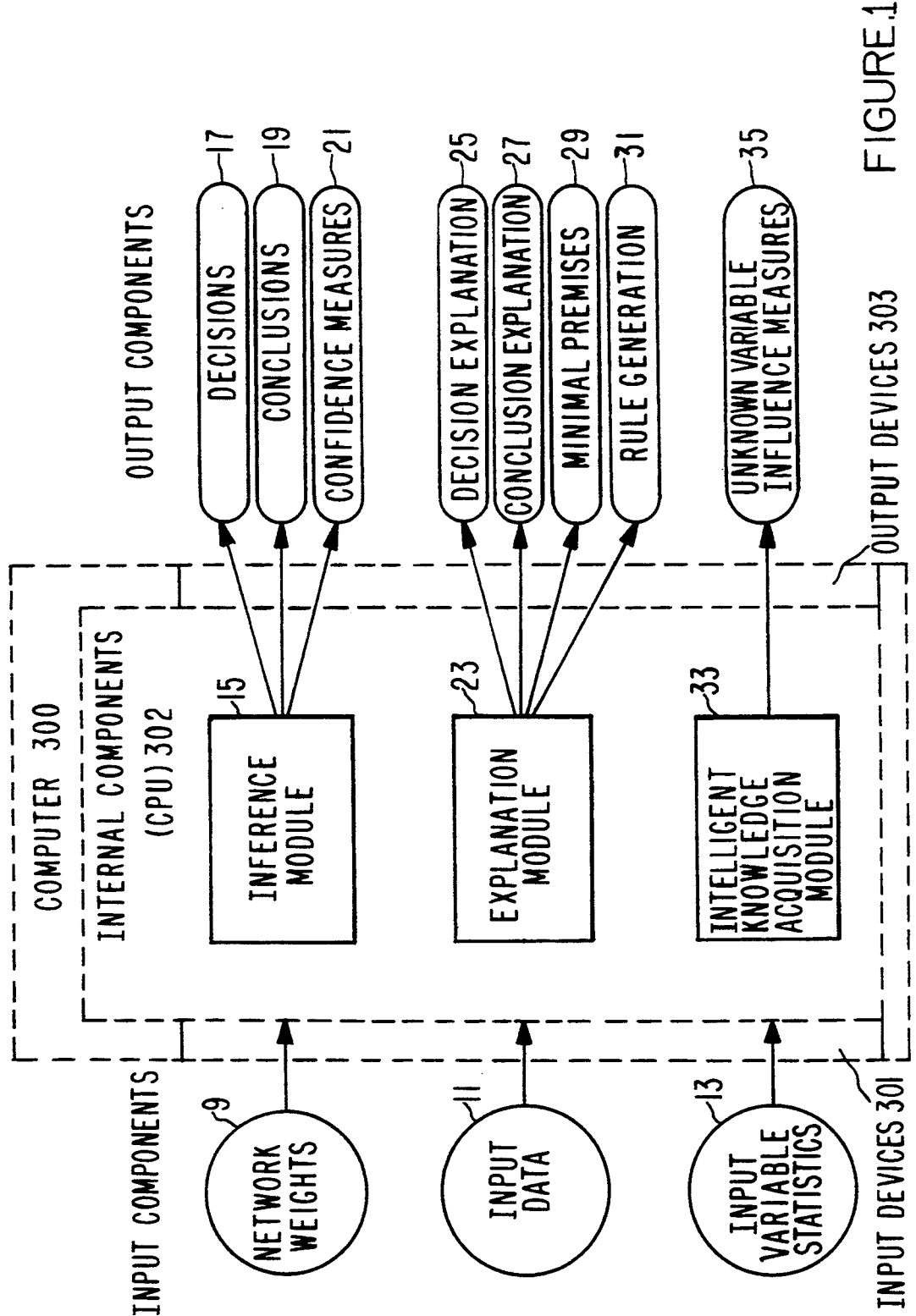
FIG. 1 is a diagram of the major components, including inputs and outputs, according to the present invention.

The present invention can operate on any continuous-state feedforward neural network of arbitrary number of layers, and with any arbitrary linear or non-linear bounded activation functions. By "continuous-state" is meant that the states of the processing elements (PEs) in each layer can take on any value (integral or fractional) between upper and lower state bounds. By "feedforward" is meant that the states of a given layer depend only upon the states of previous layers. The decision-making process according to the present invention is viewed as mapping input variables to one or more output variables. Given values for some or all of the input variables, the present invention determines the values of the output variables. Those values correspond directly to the decisions made according to the present invention. For example, if there was an output variable which represented a loan decision, a value of TRUE might correspond to a decision to approve the loan.

The present invention has three types of input variables, namely: continuous; Boolean; and symbolic. A continuous input variable can have any numerical value and it is represented by a single PE whose state is equal to that value. If the value of the variable is unknown, the state is set to some default value, typically the mean value of the variable. A Boolean input variable can have a value of either TRUE or FALSE. It is represented by a single PE with a state drawn from the set $\{-B, M, B\}$, corresponding to $\{FALSE, UNKNOWN, TRUE\}$. B is typically set at 1.0 and M is typically set to 0.0. A symbolic input variable draws its value from a finite set of symbols. An example is the variable 'region', which can have any value in the set $\{Northeast, Southeast, Northwest, Southwest\}$. Symbolic variables are represented using multiple PEs and a 1-out-of-n code. A symbolic variable with n possible values is represented by n PEs, each of which corresponds to a different value. If the value of the variable is known, the PE corresponding to the current value is given a state of B and the other PEs are given states of $-B$. If the value of the symbolic variable is unknown, all the PEs have states of M. As with Boolean variables, B is typically set to 1.0 and M is typically set to 0.0.

Output variables can be Boolean or symbolic. These types of variables are appropriate for the decision output of the present invention because they have categorical values, and decisions are inherently categorical. During operation in training mode, the network is presented with Boolean and symbolic training values, i.e., values corresponding to the correct decisions for the output variables. These training values are represented the same as Boolean or symbolic input values, using states in the set {−B,M,B}. However, the states produced in the output layer of a continuous-state feedforward network are, by definition, continuous and thus not restricted to {−B,M,B}. Therefore, the output states are interpreted as being approximations of Boolean and symbolic values.

When interpreting output states, a symbolic output variable is given the value corresponding to the underlying PE with the highest state. That PE is said to be the selected PE. A Boolean output variable is given a value according to a user-chosen Boolean decision threshold. If the underlying output state is greater than the threshold, the value of the variable is TRUE. Otherwise, the value of the variable is FALSE.

Referring now to the diagram of FIG. 1, there are shown the essential elements of the present invention. These elements are referred to as components of the invention and they are divided into three categories: input, output, and internal components. One of the input components is the set of weights 9 that results from training the network with examples from the chosen problem domain. The weights 9 encode the 'knowledge', of the network about the domain. The method of training is independent of the present invention, so a user can choose from among the learning algorithms intended for feedforward networks. Backpropagation is the most widely used learning algorithm for the powerful class of continuous-state feedforward networks with hidden layers, on which the present invention can operate.

Another major input component is the input data 11, which specifies the values of the input variables for each case that is to be analyzed by the invention. The value of any input variable can be specified as UNKNOWN for a particular case, since the present invention is designed to intelligently handle unknown values.

Still another input component is the input variable statistics 13 which are applicable only if some of the input variables are continuous. These statistics describe the distribution of values for each continuous input variable. Specifically, the system requires either the mean and standard deviation for each such variable, or the minimum and maximum for each variable. In the latter case, the means are also needed if (1) they are used as the default state when the value of a continuous input variable is unknown; or (2) the explanation module 23 will be used for Rule Generation 31. The required distribution statistics can be computed from a data set, such as the set of training examples or the set of cases to be analyzed. Alternatively, the statistics can be estimated.

Figure 2:
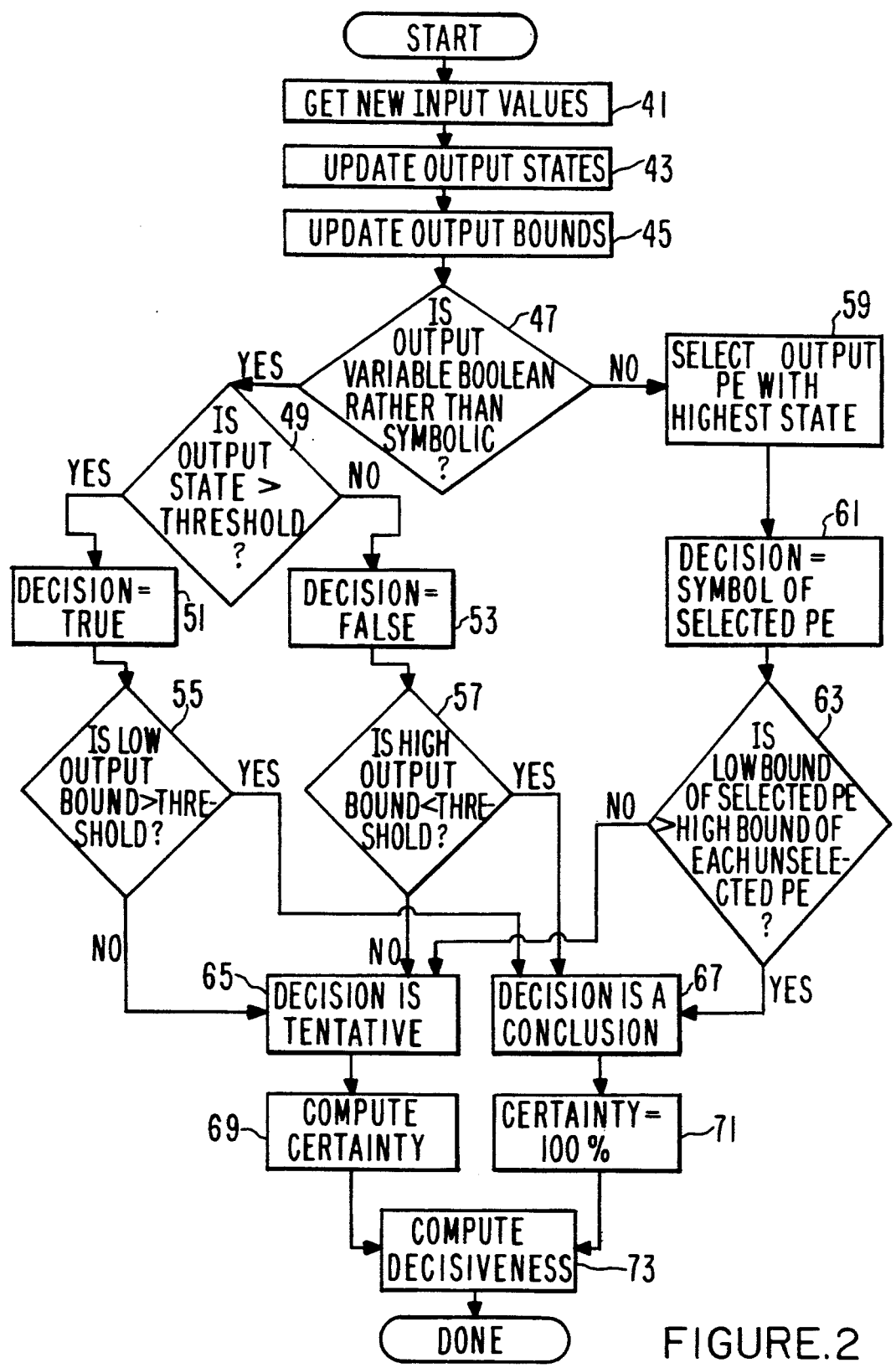
FIG. 2 is a flowchart of the operation of the Inference module according to the present invention.

The diagram of FIG. 1 illustrates that the present invention has three major internal components. The most fundamental of these components is the Inference Module 15 which is responsible for three output components; namely: decisions 17; conclusions 19; and confidence measures 21 (Decisiveness and Certainty). The operation of the Inference module is illustrated in the flowchart of FIG. 2 with regard to a single output variable. The module and figure are discussed below.

The Inference module is operated whenever the values of input variables are added, deleted, or modified, as recorded in block 41 of FIG. 2. Based on the new input values, the output states of the network are updated in block 43. Additionally, the module updates high and low bounds on those output states in block 45. These bounds are upper and lower limits on the possible range of each output state, given the known input values and any combination of values for some or all of the unknown input variables. Computing these bounds requires that assumptions be made about the possible values of continuous input variables. Details of these assumptions and the precise method for computing the bounds are explained following this overview of the Inference module.

The updated output states are used to determine the values of the output variables. Those values are the decisions 17 of the present invention. As previously explained, the method of determining output variable values or decisions from output states depends upon whether an output variable is Boolean or symbolic. If it is Boolean, then the underlying output state is compared to the user-chosen Boolean decision threshold in block 49. If the state is greater than the threshold, the decision is TRUE in block 51. Otherwise, the decision is FALSE in block 53. If an output variable is symbolic, the underlying PE with the highest output state is selected in block 59. In block 61, the decision is the symbol corresponding to the selected PE.

After updating the decision, the present invention determines whether it can declare the decision to be a conclusion 19. A conclusion can be reached when enough of the input values are known so that no combination of possible values for the unknown input variables could change the value of the output variable corresponding to the decision. For symbolic output variables, this conclusion condition is checked for in block 63. If the low bound on the state of the selected PE is greater than the high bound on the state of each unselected PE, then that selected PE is guaranteed to have the highest state given any combination of values for the unknown inputs. The conclusion condition is thus met, and the decision is declared to be a conclusion in block 67. Otherwise, the decision is said to be tentative in block 65.

For Boolean output variables, the method for checking the conclusion condition depends on the decision. If the decision is TRUE, the conclusion condition is checked in block 55. The condition is met when the low bound on the state of the underlying output PE is greater than the Boolean decision threshold, ensuring that the PE's state will exceed the threshold given any combination of values for the unknown inputs. If the decision is FALSE, the conclusion condition is checked in block 57. The condition is met when the high bound on the underlying output state is less than the decision threshold, ensuring that the state will be less than the threshold.

If all input values are known, the conclusion condition is guaranteed to be met. However, in real-world domains, it is often the case that some input values are unknown. In medical diagnosis, for example, important data may be missing because it is costly, time-consuming, or even risky to obtain. The conclusion-generating capability of the present invention overcomes the problem of missing data. The invention allows a user to know when he has enough input data to be sure of the computed decision.

The state bounds that are used to make conclusions are also used to compute the Certainty confidence measure 21 for a decision. Certainty is a measure of confidence that a conclusion for an output variable would be the same as the current decision for that variable. Certainty ranges from 0% to 100%, reaching the maximum value in block 71 only when a conclusion has been reached. Only then it is guaranteed that additional inputs won't change the decision. Before a conclusion is reached, Certainty must be computed in block 69. It is computed based on the distance between the output bounds required for the decision to become a conclusion and the actual output bounds.

For Boolean output variables, the Certainty percentage is computed as:

$$(S(o,lo)-L)*100/(T-L) \text{ for TRUE decisions}$$

$$(U-S(o,hi))*100/(U-T) \text{ for FALSE decisions}$$

where S(o, hi) and S(o, lo) are the high and low bounds on the state of the underlying output PE(o), U and L are the upper and lower limits respectively on the output of the transfer function of o, and T is the Boolean decision threshold.

For symbolic output variables, the Certainty percentage is computed as:

$$[\{(S(o,lo)-S(o',hi))/(U-L)\}+1]*100$$

where o is the selected output PE and o' is the unselected PE with the highest high bound.

A second confidence measure 21, Decisiveness, measures the strength of a decision and is computed in block 73. The maximum possible decision strength is indicated by a Decisiveness value of 100%. A value near 0% indicates a weak decision. Decisiveness is computed based on the distance between output states and decision boundaries. Specifically, for Boolean output variables, the Decisiveness percentage equals:

$$(S(o)-T)*100/(U-T) \text{ for TRUE decisions}$$

$$(T-S(o))*100/(T-L) \text{ for FALSE decisions}$$

where S(o) is the state of the underlying output PE(o).

For symbolic output variables, the Decisiveness percentage equals:

$$(S(o)-S(o'))*100/(U-L)$$

where o is the selected output PE and o' is the unselected PE with the highest state.

The medical domain provides an example of the usefulness of the confidence measures described above. If the present invention were used to make diagnostic decisions, those decisions could have life-and-death consequences. Before trusting a particular decision or acting upon it, a physician would want to know how much confidence he should have in that decision. Decisiveness will tell him how clearly the diagnostic decision is favored over alternative diagnoses. Certainty will tell him how likely it is that the decision would remain the same were he to gather additional information.

Note that the two confidence measures are only indirectly related. It is possible to have a high Certainty value but a low Decisiveness value or vise versa. For example, the former case occurs when a weak decision becomes a conclusion.

Turning now to the precise method for computing the bounds on output states, the method requires that assumptions be made about the possible values of continuous input variables. These assumptions are based on the input variable distribution statistics 13. If the user chooses to use the minimum and maximum statistics, the present invention assumes that the possible values of an unknown continuous input variable fall between its minimum and maximum. If the user chooses to use the mean and standard deviation instead, he must also specify a positive range value r, which applies to all continuous input variables. The invention assumes that the possible values of an unknown continuous variable i fall in the range defined by the following limits:

$$\text{lower limit} = Mean(i) - (r*Sd(i))$$

$$\text{upper limit} = Mean(i) + (r*Sd(i))$$

where Mean (i) and Sd (i) are the mean value and standard deviation of variable i.

The bounds on the states of output PEs are computed using the following recursive equations for the state bounds of any non-input PE. If p is a non-input PE, its state bounds are computed as:

$$S(p,lo) = T(\Sigma_s C(s,p,lo))$$

$$S(p,hi) = T(\Sigma_s C(s,p,hi))$$

where T is the transfer function of p and C(s,p,hi) and C(s,p, lo) are the high and low bounds on the contributions made to the net-input of p by each of its sources s. Each s is either a hidden PE, input variable, or bias (special input PE whose state is always equal to 1.0).

Which of the three s is determines how the contribution bounds are computed. If s is a bias, then:

$$C(s,p,lo) = C(s,p,hi) = W(s,p)$$

where W(s,p) denotes the weight of the connection from s to p.

If s is a hidden PE, then the following equations are used: If W(s,p) > 0 then $$C(s,p,lo) = W(s,p)*S(s,lo)$$

$$C(s,p,hi) = W(s,p)*S(s,hi)$$

Otherwise $$C(s,p,lo) = W(s,p)*S(s,hi)$$

$$C(s,p,hi) = W(s,p)*S(s,lo)$$

If s is an input variable, then the calculation of contribution bounds depends on the data type of s and whether s is known or unknown. If s is Boolean or continuous and known to have a value v, then:

$$C(s,p,lo) = C(s,p,hi) = v*W(i,p)$$

where i is the PE underlying s.

If s is Boolean or continuous and its value is unknown, then the following equations are used:
If W(i,p) > 0 then $$C(s,p,lo) = W(i,p)*Min(s)$$

$$C(s,p,hi) = W(i,p)*Max(s)$$

Otherwise $$C(s,p,lo) = W(i,p)*Max(s)$$

$$C(s,p,hi) = W(i,p)*Min(s)$$

where Max(s) and Min(s) are the maximum and minimum possible values of s. If s is Boolean, Max(s) is B and Min(s) is −B, where B and −B are the values used to represent TRUE and FALSE respectively. If s is continuous, Max(s) and Min(s) are the upper and lower assumed limits on s, as derived from the distribution statistics.

If s is symbolic and known to have a value corresponding to PE v in the underlying choice group, then:

$$C(s,p,lo) = C(s,p,hi) = C(s,p,v)$$

where C(s,p,v) is the contribution s makes to the net-input of p when the value of s corresponds to v. Specifically, $$C(s,p,v) = (W(v,p) - \Sigma_{i<>v} W(i,p))*B$$

where i iterates over the PEs in the underlying choice group.

If s is symbolic and its value is unknown, then:

$$C(s,p,lo) = Min(C(s,p,i))$$

$$C(s,p,hi) = Max(C(s,p,i))$$

where Max and Min are computed over all PEs i in the underlying choice group.

Figure 6:
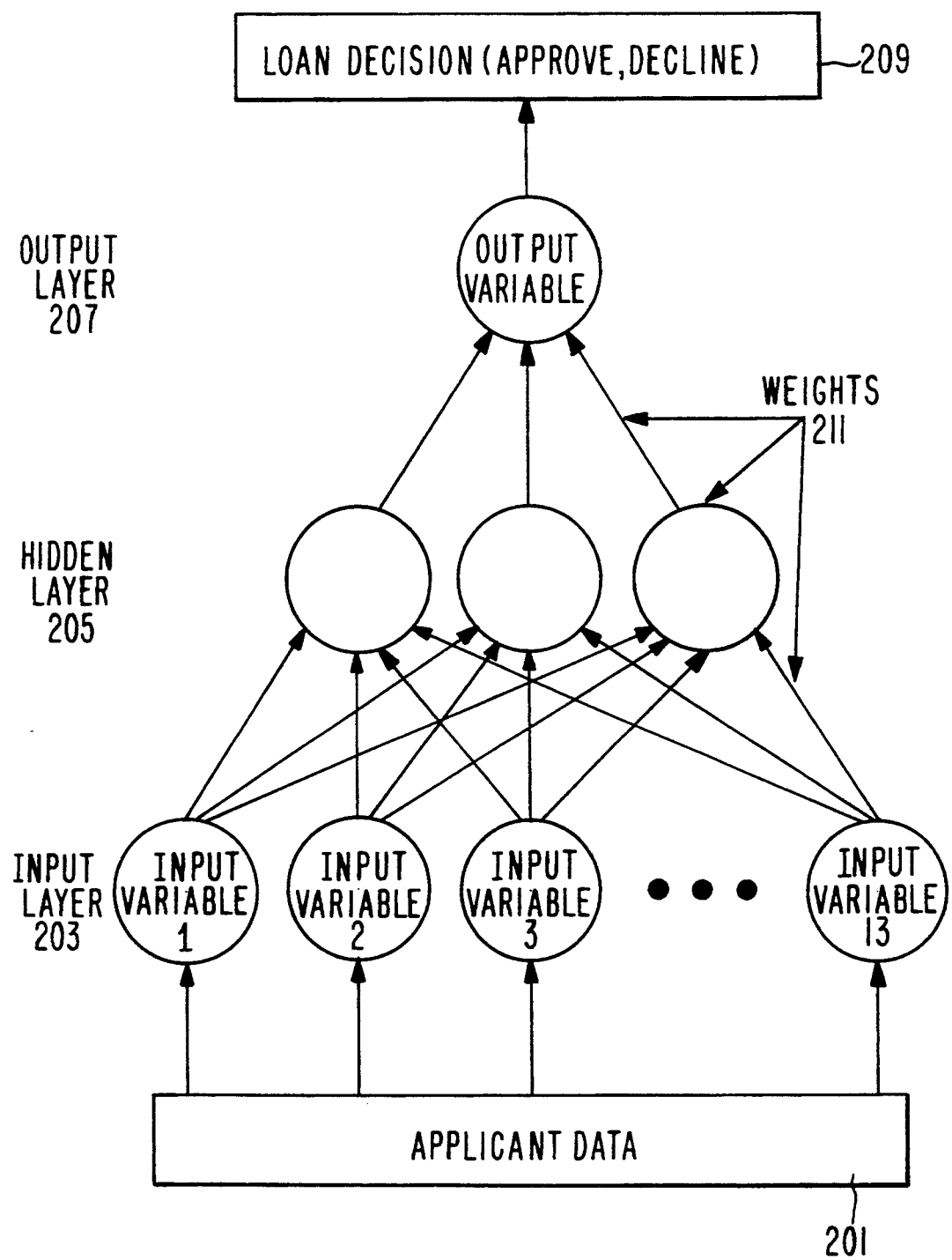
FIG. 6 is a diagram of the neural network architecture and data flow therethrough according to the present invention for operation on a loan-scoring problem.

An example problem is now used to demonstrate the operation of the Inference module described directly above. The example involves making decisions on personal loan applications, based on individual applicant data. The neural network architecture and data flow used for this problem are illustrated in FIG. 6. The network is simulated using computer software, although the present invention is equally applicable to a network implemented in hardware. The present invention can be implemented using any of the techniques and physical elements discussed in Hecht-Nielsen, "Performance Limits of Optical, Electro-Optical, and Electronic Neurocomputers", *SPIE Proceedings*, 634, 1277–306, Bellingham, Washington (1986), which paper is hereby incorporated by reference into the present patent application.

The neural network 9 and the inventive modules 15,23,33 can be implemented in software, firmware, or hardware, or any combination thereof. FIG. 1 shows items 9,15,23,33 residing as software or firmware elements within digital computer 300 having a central processing unit (CPU) 302, a set of input devices 301, and a set of output devices 303. Neural network weights 9, after they are loaded into CPU 302, define the neural network, which is then acted upon by modules 15,23,33.

Input components 9,11,13 are entered into CPU 302 by any input device 301 or group of devices 301. For example, network weights 9 are typically entered into CPU 302 from a tape drive 301 or disk drive 301. Input data 11 are typically entered into CPU 302 via a direct user input such as a keyboard 301 or a mouse 301, directly from another computer 301, via a disk 301 or tape 301, or from another neural network 301. Input variable statistics 13 are typically input into CPU 302 via a tape 301 or disk 301 following prior statistical analysis.

Output components 17,19,21,25,27,29,31,35 are output by CPU 302 onto any output device 303 or group of devices 303. Examples of suitable output devices 303 include printers, plotters, and display means such as cathode ray tubes and liquid crystal displays.

Computer 300 is any standard digital computer such as a personal computer or a workstation. An example of a suitable personal computer is an IBM PC or clone thereof. An example of a suitable workstation is one manufactured by Sun Microsystems. Alternatively, computer 300 can be a coprocessor that is coupled to such a digital computer. Examples of suitable coprocessors are Anza Plus and Balboa 860, both of which are manufactured by HNC, Inc., San Diego, Calif. These coprocessors optimize the speed of execution of the present invention.

The present invention has been incorporated in a commercial software product called KnowledgeNet, which runs in conjunction with a software package called ExploreNet 3000. Both products are manufactured by HNC, Inc., San Diego, Calif.

Alternatively to the use of the digital computer 300, the present invention can be implemented on an analog computer.

When the present invention is implemented in firmware, modules 15,23,33 are coded into programmable read only memory (PROM).

When the present invention is implemented in hardware, modules 15,23,33 are hard wired to constitute dedicated computing elements.

The input layer 203 of the network contains thirteen PEs, one for each of thirteen continuous input variables. The input layer is fully connected to a single hidden layer 205 containing three PEs, which in turn is fully connected to an output layer 207 consisting of a single PE. The output PE represents a Boolean variable whose value corresponds to the loan decision 209. A TRUE value corresponds to a decision to approve the loan, and a FALSE value corresponds to a decision to decline. The output and hidden PEs have a conventional sigmoid transfer function, with output in the range [−1.0,1.0].

Note that the network in FIG. 6 is just one example of the type of neural network on which the present invention can operate. In general, the invention can operate on a feedforward network with any number of hidden layers (including zero), any number of PEs in the hidden, input, and output layers, and an arbitrary transfer function for a PE (different PEs can have different transfer functions).

The particular network is trained using backpropagation learning, which modifies the weights 211. The backpropagation learning algorithm, which is independent of the present invention, involves a backward data flow in addition to the feedforward flow depicted in FIG. 6. The network of FIG. 6 is trained on data 201 which represents examples of previous applicants whose loan outcomes are known. Each example is assigned a training value of either Approve (1.0) or Decline (−1.0), depending on whether the applicant defaulted on the loan. The applicant is described by the values of the thirteen input variables, which are explained in the table of FIG. 7. The table also contains the input values for an actual applicant in the test database.

Using the network in FIG. 6, the present invention is able to make a conclusion about this sample applicant, despite two missing input values in the data described in FIG. 7. The concluded decision is to approve the loan. This decision corresponds to a TRUE value for the output variable and is a correct decision in that the applicant satisfactorily repaid the actual loan. Since a conclusion was reached, Certainty is 100%. Decisiveness is computed to be 13.4%, using the formula described above for Decisiveness given a TRUE decision (Decisiveness was usually below 40% for examples in the test database). In order to further demonstrate, assume that only those values in FIG. 7 which came from a credit report (i.e., values for Active Accounts, New Accounts, # of Inquiries, Public Record Items, Time in Credit File, and the three Overdue variables) are known. Now there are too many unknown inputs to allow a conclusion, so the present invention produces a tentative decision instead. The decision is to approve, with Decisiveness of 10.1% and Certainty of 47.4%. These values are computed using the Decisiveness and Certainty formulas for TRUE decisions.

Referring again to FIG. 1, the second internal component is the Explanation module 23. This module produces two types of explanation. One type explains any decision, whether tentative or conclusive, by computing the contribution each known input value makes to that decision. This type is Decision Explanation 25 and is based on output states. The other type, Conclusion Explanation 27, examines output bounds to explain how a conclusion was reached. Conclusion Explanation computes the contributions made by known inputs toward reaching the conclusion condition, and also determines a minimal subset of those inputs that is sufficient to support the conclusion.

Note that both types of contributions are computed in the context of the current set of input values. Thus the contribution made by a given input variable to a given decision or conclusion is dependent not just on the variable's own value, but also on the values (or lack thereof) of the other input variables. Thus, both types of explanation capture the interdependency among inputs that is found in feedforward networks with hidden layers.

Figure 3A:
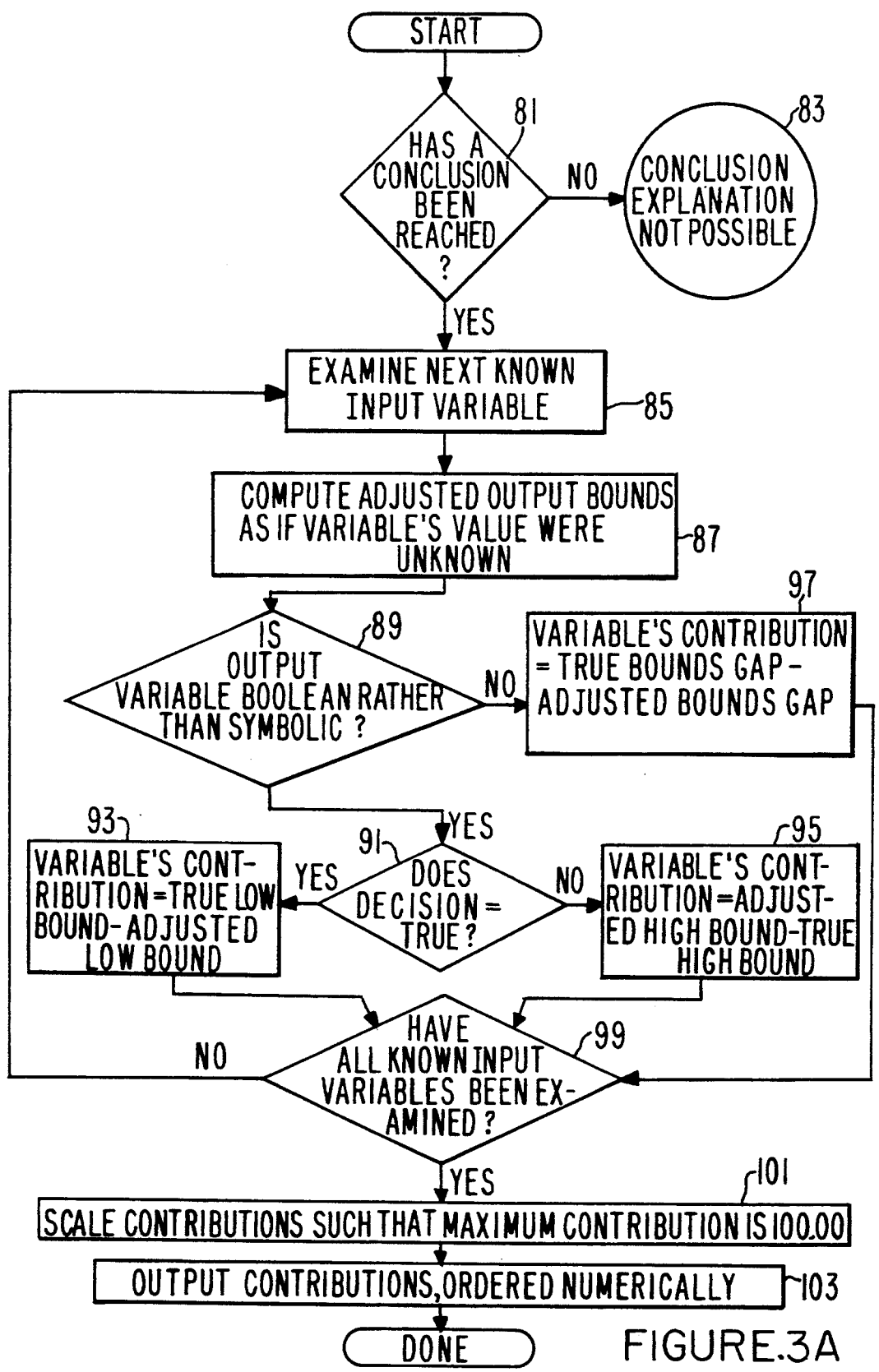
FIGS. 3A and 3B are flowcharts of the operation of the Conclusion Explanation according to the present invention.

Conclusion Explanation 27 computes a contribution for each known input variable that is equal to the decrease in the strength of the conclusion condition when the value of the variable is assumed to be unknown. That strength is measured as the distance between the bounds representing the conclusion condition and the actual bounds on the states underlying the output variable for which the conclusion has been reached. The operation of Conclusion Explanation is illustrated in the flowchart of FIG. 3A with regard to a single output variable. The module and figure are discussed below.

In block 81 of FIG. 3A, the present invention checks to see if a conclusion has been reached for the output variable for which explanation is desired. If no conclusion has been reached, Conclusion Explanation is not possible in block 83. Otherwise, Conclusion Explanation proceeds in block 85 by examining the first or next input variable whose value is known. The value of that variable is temporarily assumed to be unknown, and the bounds on the output states are temporarily adjusted in block 87 to reflect that assumption. The adjusted and true (before adjustment) output bounds are compared to determine the contribution of the input variable being examined.

The method of computing the contribution is dependent on whether the output variable is Boolean or symbolic in block 89. If the output variable is Boolean, the contribution is further dependent on whether the decision for that variable is TRUE or FALSE in block 91. If the decision is TRUE, the conclusion condition is based on the low bound on the state of the PE underlying the Boolean output variable, and thus the contribution in block 93 is equal to the true low bound minus the adjusted low bound on the underlying state. If the decision is FALSE, the conclusion condition is based on the high bound, and thus the contribution in block 95 is the adjusted high bound minus the true high bound on the underlying state. Formally, the contributions equal:

$$S(o,lo) - S'(o,lo) \text{ for TRUE decisions}$$

$$S'(o,hi) - S(o,hi) \text{ for FALSE decisions}$$

where o is the underlying output PE, S signifies the true bounds, and S' signifies the adjusted bounds.

If the output variable is symbolic, the conclusion condition is based on the gap between the low bound on the state of the selected PE and the highest high bound among the unselected PEs. Thus, for symbolic output variables, the contribution in block 97 is equal to the gap given the true bounds minus the gap given the adjusted bounds. Formally, the contribution equals:

$$(S(o,lo) - S(o',hi)) - (S'(o,lo) - S'(o'',hi))$$

where o is the selected output PE, o' is the unselected PE with the highest true high bound, and o'' is the unselected PE with the highest adjusted high bound.

Note that all contributions computed by Conclusion Explanation will be non-negative. This results from the combination of these facts: 1. the contribution of an input variable is computed relative to that variable being unknown; 2. when the value of an input variable becomes known, the bounds on each output state either stay the same or become narrower, where narrower bounds mean that the high bound has decreased and/or the low bound has increased; 3. Narrower output bounds can strengthen, but not weaken, the conclusion condition; and 4. the contributions measure the strengthening of the conclusion condition.

After computing the contribution for a particular input variable, the present invention checks in block 99 to see whether all known input variables have been examined. If not, the next known variable is examined. Otherwise, Conclusion Explanation proceeds to block 101, where the contributions for all known input variables are multiplied by a scaling constant, determined such that the largest scaled contribution is 100.0. The constant is calculated by dividing 100.0 by the maximum of the unscaled contributions. In block 103, the scaled contributions, along with the corresponding variable names and values, are produced as output. The output is ordered numerically by contribution.

Conclusion Explanation further explains a conclusion by finding the minimal premises, a subset of the known input values that, by themselves, are sufficient for reaching the conclusion. Known inputs not in the minimal premises could be unknown and the conclusion would still hold. The conclusion and minimal premises can be viewed together as a rule which states a set of sufficient conditions for reaching the conclusion, independent of the case currently being analyzed.

Figure 3B:
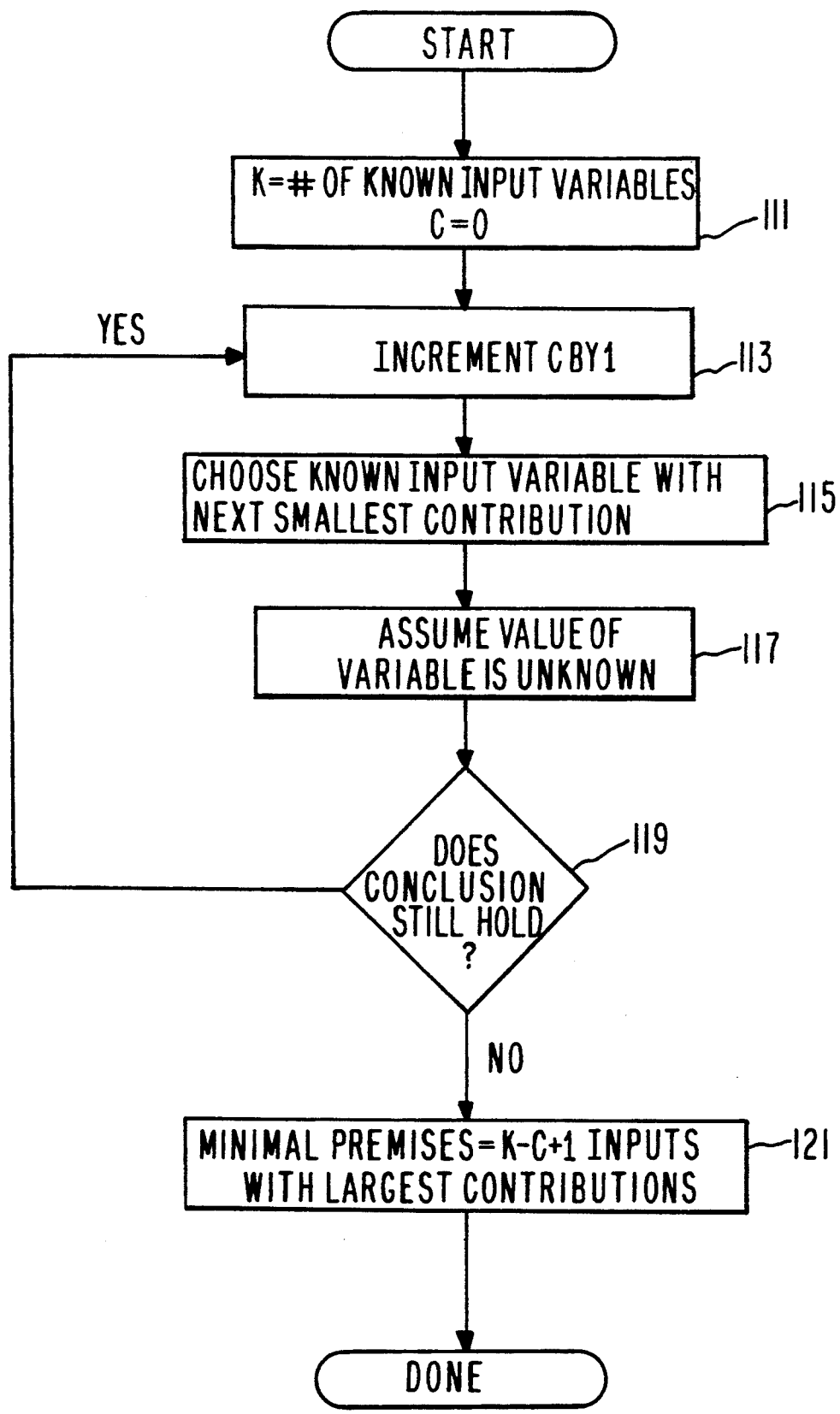

The operation of Conclusion Explanation in finding the minimal premises is illustrated in FIG. 3B. The first step is to set k to the number of known input variables and to initialize the count c to zero in block 111. Each time block 113 is reached, c is incremented by 1. The first time through block 115, the present invention chooses the known input variable with the smallest contribution. It assumes the value of that variable to be unknown in block 117. In block 119, it checks to see if the conclusion condition, as determined by the Inference module, still holds in light of that assumption. If the conclusion is still supported, the known input variable with the second smallest contribution is chosen in a return to block 115. The value of this variable is also assumed to be unknown. This process repeats, with c counting the number of known input variables assumed to be unknown. When the conclusion no longer holds in block 119, the minimal premises are determined in block 121. The minimal premises are determined to consist of the $k-c+1$ inputs with the largest contributions.

FIG. 9 contains an example of the output of Conclusion Explanation, using the sample loan applicant described in FIG. 7 and the network described in FIG. 6. For each known input variable, the output lists the contribution and indicates whether the variable belongs to the minimal premises. The contributions were computed using the formula described above for contributions given a TRUE decision. The minimal premises are distinguished in the output with the heading Sufficient. Known input variables that are not among the minimal premises are listed under Additional. FIG. 9 shows that the minimal premises, in this case, include all known input variables except for Time in Credit File. It also shows that the values of 30-Days Overdue Now and # of Inquiries were the most important factors in reaching the Approve conclusion.

The second type of explanation, Decision Explanation 25, measures the contribution made by each known input variable to a decision. This type of explanation is best explained by contrasting it to Conclusion Explanation 27. Both types of explanation measure the contribution made by each known input variable by examining the change in output when the value of the variable is assumed to be unknown. However, Conclusion Explanation examines changes in output bounds, whereas Decision Explanation examines changes in output states. This difference is motivated by the fact that Conclusion Explanation measures contributions to the conclusion condition, which is based on output bounds, while Decision Explanation measures contributions to a decision, which is based on output states.

An additional difference concerns the sign of the contributions. As explained earlier, contributions in Conclusion Explanation cannot be negative, because knowing the value of an input variable can only strengthen the conclusion condition or leave it unchanged, relative to not knowing the value. However, knowing the value of an input variable can weaken as well as strengthen a decision, as indicated by a decrease or increase in the Decisiveness confidence measure. Thus, contributions in Decision Explanation can be negative or positive. As a matter of fact, a particular value for an input variable can make a positive contribution to a particular decision in one input context, yet make a negative contribution to that same decision in another context. This is due to the interdependency among inputs that is found in feedforward networks with hidden layers.

Figure 4:
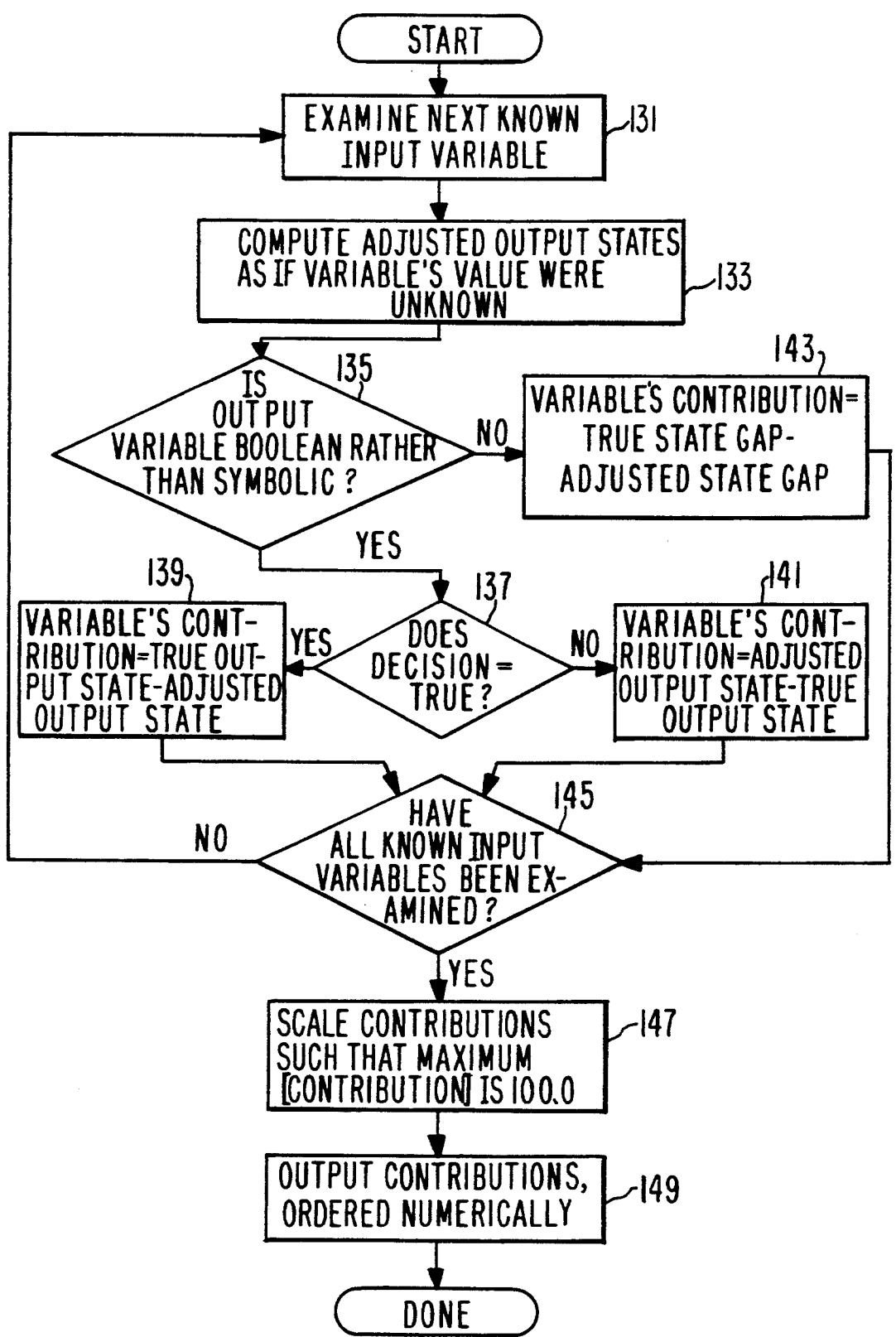
FIG. 4 is a flowchart of the operation of the Decision Explanation according to the present invention.

The operation of Decision Explanation is illustrated in the flowchart of FIG. 4 with regard to a single output variable. The module and figure are explained as follows: in block 131, the present invention examines the first or next input variable whose value is known. The value of that variable is temporarily assumed to be unknown, and the output states are temporarily adjusted in block 133 to reflect that assumption. The adjusted and true (before adjustment) output states are compared to determine the contribution of the input variable being examined.

The method of computing the contribution is dependent on whether the output variable is Boolean or symbolic in block 135. If the output variable is Boolean, the contribution is further dependent on whether the decision for that variable is TRUE or FALSE in block 137. If the decision is TRUE, the contribution in block 139 is equal to the true state minus the adjusted state of the PE underlying the Boolean output variable. If the decision is FALSE, the contribution in block 141 is the adjusted output state minus the true output state. Formally, the contributions equal:

$S(o) - S'(o)$ for TRUE decisions $S'(o) - S(o)$ for FALSE decisions where o is the underlying output PE, S signifies the true state, and S' signifies the adjusted state.

If the output variable is symbolic, the contribution in block 143 is based on the gap between the state of the selected PE and the highest state among the unselected PEs. The contribution is equal to the gap given the true states minus the gap given the adjusted states. Formally, the contribution equals:

$(S(o) - S(o')) - (S'(o) - S'(o''))$ where o is the selected output PE, o' is the unselected PE with the highest true state, and o" is the unselected PE with the highest adjusted state.

After computing the contribution for a particular input variable, the present invention checks in block 145 to see whether all known input variables have been examined. If not, the next known variable is examined. Otherwise, Decision Explanation proceeds to block 147, where the contributions for all known input variables are multiplied by a scaling constant, determined such that the largest absolute value of any contribution is 100.0. The constant is calculated by dividing 100.0 by the maximum absolute value of the unscaled contributions.

In block 149, the scaled contributions, along with the corresponding variable names and values, are produced as output. The output is ordered numerically by contribution. In addition, the output distinguishes three groups of known input variables: 1. those which make insignificant contributions to the decision, i.e., contributions whose absolute values fall below a user-chosen significance threshold; 2. those which significantly support the decision, i.e., those with positive contributions at or above the threshold; and 3. those which significantly weaken the decision, i.e., those with negative contributions whose absolute values are at or above the threshold.

FIG. 8 contains an example of the output of Decision Explanation, again using the loan applicant described in FIG. 7 and the network described in FIG. 6. The output was produced using a significance threshold of 20.0. The contributions listed in the output were computed using the formula described above for contributions given a TRUE decision. The output shows that there were four factors significantly supporting the Approve decision. The largest such factor was the value of New Accounts. The other three factors involve the Overdue variables. The only factor significantly weighing against approval was the value of Time in Credit File. Note in FIG. 9 that Time in Credit File was also the least supportive input variable as indicated by Conclusion Explanation. It made the smallest contribution and was the only known input variable not in the minimal premises. However, in general, there is only an indirect relationship between a variable's ranking according to the two types of explanation, since each measures a different property.

Determining contributions in Decision Explanation requires computing adjusted output states, based on the assumption that a known input variable is unknown. However, computing the adjusted states does not require network iterations. This contrasts with conventional sensitivity analysis, where the effect of changing an input is determined by iterating the network after making the change. The present invention includes a method for finding the modified output resulting from a change in input, while avoiding the computational expense of a network iteration.

Computation of a network iteration involves all the weights in the network, but in accordance with the present invention, a simpler partial weights method is used which involves only a subset of the weights. This is important because the computer time required for the computation is roughly proportional to the number of weights used. Specifically, the partial weights method, according to the present invention, uses only the weights associated with connections that lie in a path between one of the input PEs whose state is being changed and one of the output PEs for which state change is being measured.

Exactly which connections lie in such a path depends on the number of hidden layers and on the connectivity of the network. In order to provide a specific example, reference is made to the network in FIG. 6. Suppose it is necessary to find the modified output state of this network that results from changing the state of input PE i from v to v'. The partial weights method uses only the weights for the connections from i to each of the three hidden PEs and the connections from each hidden PE to the output PE.

The first step in the partial weights computation for the network in FIG. 6 is to calculate the resulting net-input of each of the three hidden PEs. The resulting net-input $I'(h)$ for each hidden node h is equal to $I(h)+((v'-v)*W(i,h))$, where $W(i,h)$ is the weight of the connection from i to h and $I(h)$ is the original net-input for h. The next step is to compute the resulting state for each of the hidden PEs. $S'(h)$, the new state of h, is equal to $T(I'(h))$, where T is the conventional sigmoid transfer function used by the network of FIG. 6. The modified output state is then computed by applying T to the weighted sum of each $S'(h)$.

Using the partial weights method, according to the present invention, each of the decision contributions in FIG. 8 were computed with only 6 weights. Without the method, each contribution would have required computing a network iteration, which uses 42 weights. The partial weights method is also used to compute the changes in decisions and Decisiveness that result when the user adds, modifies, or deletes input values.

In addition to explaining decisions and conclusions, the Explanation module 23 has the ability to do Rule Generation 31. This process produces a set of if-then rules, each of which consists of some number of possible input values and a decision. A rule is interpreted to mean that the decision would be supported as a conclusion if the input values were known to be true. These rules are intended to approximately represent the knowledge implicit in the weights of the network. By making the relationship between input values and decisions explicit, the knowledge in the network is made explicit. The conversion from weights to rules results in some loss of precision, but the rules are intended only as an aid to a user who wishes to analyze the knowledge contained in the network, and are not a requirement for any of the other capabilities of the present invention.

A key to Rule Generation is the minimal premises 29 described earlier. The input values in a rule constitute a set of minimal premises for reaching the conclusion in the rule. In other words, Rule Generation constructs rules such that if any of the input values in the rule were removed, the conclusion of the rule would no longer hold. Rule Generation constructs rules by producing sets of minimal premises to support hypothetical conclusions, where the premises consist of hypothetical (but possible) input values. Specifically, rules are generated for an output variable by finding sets of hypothetical minimal premises that can support one of the possible decisions for that variable as a conclusion. Each unique set of minimal premises found results in a rule. All possible sets are found and thus all possible rules are generated, restricted only by the user's option to specify a maximum number of premises per rule.

All possible sets of minimal premises are found by doing a search of input space. Specifically, Rule Generation uses a conventional depth-first tree search. In the context of the present invention, the paths through the simulated tree correspond to possible combinations of input values. Each level in the tree corresponds to a different input variable. Each node in the tree has $n+1$ branches, where n is the number of possible values for the input variable corresponding to the level at which the node exists. One branch corresponds to each possible value and the extra branch corresponds to the value being unknown. For Boolean input variables, the possible values are TRUE and FALSE, so n is 2. For symbolic variables, n is the number of possible symbols. For continuous variables, there are an infinite number of possible values, so a representative sample of the values must be chosen. The solution in the present invention is to choose three values representative of different regions within the value range of a given continuous input variable. The specific method for choosing these values is explained later.

Searching along a particular path in the tree is interpreted as choosing the value (possibly UNKNOWN) corresponding to each branch in the path. Thus, when the search reaches m levels down in the tree, the values of m input variables have been either set or said to be unknown. The search follows each possible path until the set values result in a conclusion or the bottom of the tree is reached. If the bottom is reached without a conclusion, then that path produces no rule. However, if a conclusion is reached, the known values set in that path, along with the conclusion, constitute a candidate rule. The candidate rule will be chosen only if its premises are minimal, i.e., if all of the known values set in the path are required to support the conclusion. Rule Generation checks to see if any of the known values can be assumed to be unknown without a resulting loss of the conclusion. If so, the premises are not minimal, and the candidate rule is thrown away. Otherwise, the candidate rule is included in the output of Rule Generation.

Turning now to the precise method for choosing the three sample values for each continuous input variables, Rule Generation chooses a value from the upper, lower, and middle regions of the variable's value range. The chosen values are referred to as High, Low, and Medium, and are computed from the input variable statistics 13. The Medium value is equal to the mean of the input variable. The values for High and Low depend on which statistics are used. If the minimum and maximum statistics are used, the following values are chosen for continuous input variable i:

$$Low = (3\ Min(i) + Max(i))/4$$

$$High = (3\ Max(i) + Min(i))/4$$

where Min(i) and Max(i) are the minimum and maximum values of i. The chosen values correspond to points one-quarter and three-quarters of the way through the interval [Min(i), Max(i)].

If the mean and standard deviation statistics are used, the following values are chosen:

$$Low = Mean(i) - (z*Sd(i))$$

$$High = Mean(i) + (z*Sd(i))$$

where Mean(i) and Sd(i) are the mean value and standard deviation of variable i, and z is a positive value chosen by the user that applies to all continuous input variables.

FIG. 11 contains a typical rule produced by Rule Generation, using the method described above. The loan-scoring problem is again used as an example. Since this problem involves continuous input variables, it provides a good example of the present invention's method for using continuous variables as rule premises, i.e., the method of using High, Low, and Medium values. The rule in FIG. 11 specifies six input values which are sufficient for supporting an Approve conclusion. If an applicant has those six values, he can be assured of approval, regardless of his values for the remaining seven input variables.

Referring again to FIG. 1, the third internal component is the Intelligent Knowledge Acquisition module 33. The term 'intelligent knowledge acquisition' refers to a systematic method for determining what knowledge is most profitable to pursue. In the context of the present invention, this involves estimating which unknown input variables will have the greatest impact on a particular output variable if their values become known. By pursuing values for the unknown input variables with the greatest influence, the user can decrease the number of additional inputs needed to reach a conclusion. This is especially important in domains, such as medical diagnosis, where there can be a significant cost, risk, or time delay associated with gathering information.

Figure 5:
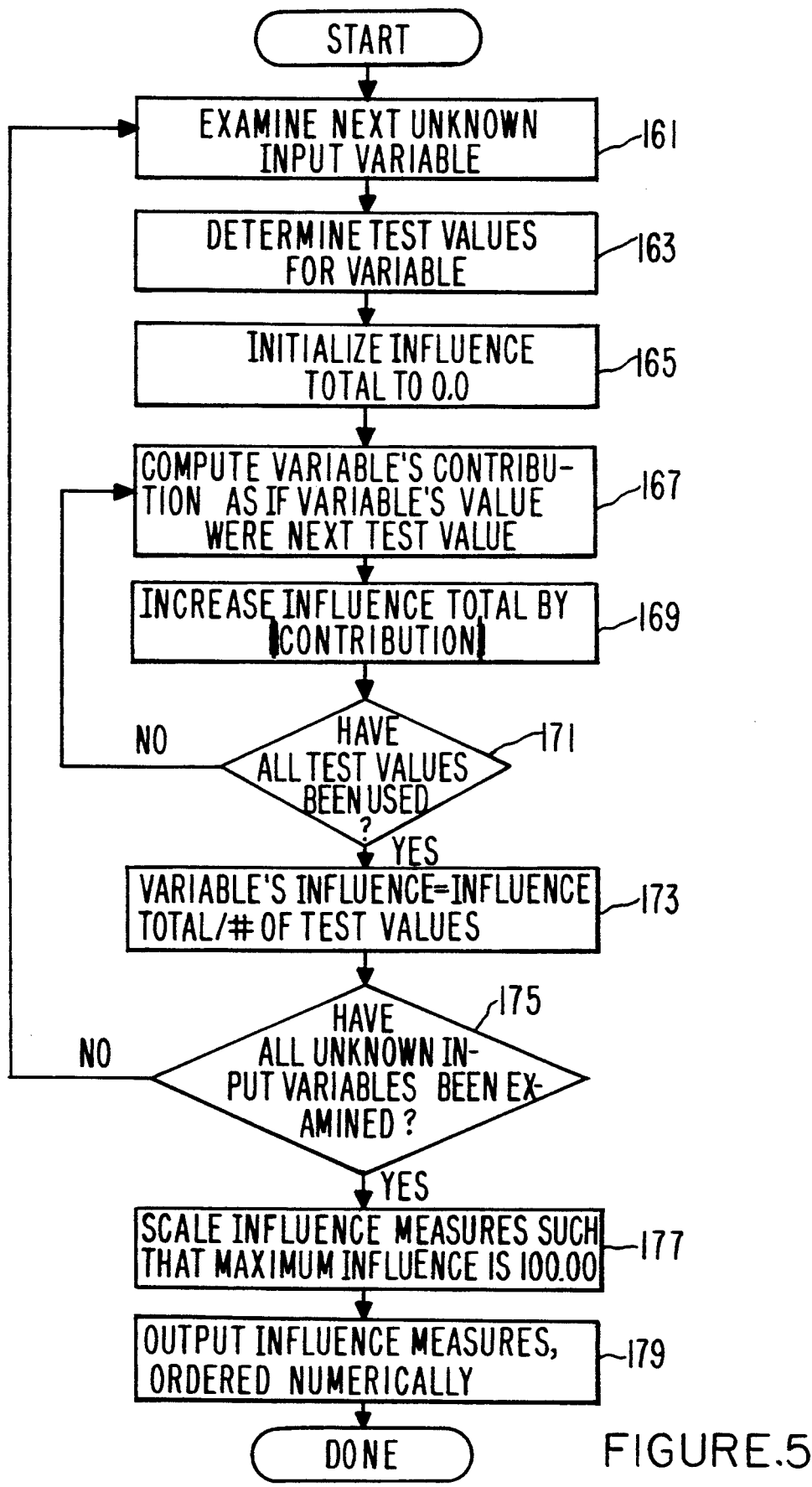
FIG. 5 is a flowchart of the operation of the Intelligent Knowledge Acquisition module according to the present invention.

The operation of the Intelligent Knowledge Acquisition (IKA) module is illustrated in the flowchart of FIG. 5. The module measures the potential influence of each unknown input variable 35 on a user-chosen output variable. In block 161 of FIG. 5, the IKA module examines the first or next input variable whose value is unknown. Test values are determined for the variable in block 163. If the variable is Boolean or symbolic, each possible value of the variable is used as a test value. If the variable is continuous, two test values are chosen. They are computed using the same formulas by which High and Low values are chosen for continuous input variables in Rule Generation 31.

After the test values for the input variable are determined, an influence total is initialized to zero in block 165. The first or next test value is chosen in block 167 and the input variable is temporarily assumed to have that value. The module computes the contribution made by that input value to the decision for the user-chosen output variable. The contribution is computed using the same formulas by which Decision Explanation 25 computes contributions. The absolute value of the computed contribution is added to the influence total in block 169. If all test values have been used in block 171, an influence measure for the input variable is computed in block 173 by dividing the influence total by the number of test values. The influence of an unknown variable is thus computed to be the mean absolute value of the contributions made by the variable's test values.

After computing the influence of a variable, the IKA module checks to see, in block 175, if all unknown input variables have been examined. If not, the next unknown variable is examined. Otherwise, the module proceeds to block 177, where the influence measures for all unknown input variables are multiplied by a scaling constant, determined such that the largest measure is 100.0. The constant is calculated by dividing 100.0 by the maximum of the unscaled measures. In block 179, the scaled influence measures, along with the corresponding variable names, are produced as output. The output is ordered numerically by influence measure.

FIG. 10 contains an example of the output of the IKA module, again using the loan applicant described in FIG. 7 and the network described in FIG. 6. As in an earlier example, this example assumes that we know only those values listed in FIG. 7 that came from a credit report. That leaves five unknown input variables. The output in FIG. 10 shows the influence measures computed for those five variables, using the method illustrated in the flowchart of FIG. 5. The measures indicate that knowing the value of Bankcard Accounts or Time at Job would be most valuable for reaching a conclusion, whereas knowing the value of Time at Address would be least valuable.

Note that the influence measures computed by the IKA module are dependent on the current set of input values, as is the case with the contributions computed by the Explanation module 23. Thus, an unknown input variable may be important in some situations, as indicated by a large influence measure, and unimportant in others.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

In the claims, the following words are meant to encompass the plural as well as the singular: state, output variable, input variable, decision, conclusion, value, processing element. In the claims, the following words are meant to encompass the singular as well as the plural: states, output variables, input variables, decisions, conclusions, values, processing elements. Nothwithstanding the above, there can be only one decision and one conclusion per output variable at any given time.

What is claimed is:

1. A computer-implemented process for determining high and low bounds on states of output processing elements (PEs) and any hidden PEs in a continuous-state feedforward neural network additionally having input PEs and that is stored in a computer, wherein said bounds serve as limits on the possible range of each such state, said computer comprising a CPU and an input device coupled to said CPU, said CPU comprising an inference module, said neural network being fed into said CPU via said input device, said process comprising commanding the inference module to execute the steps of:
  determining upper and lower bounds on states of the input PEs using input variable distribution information that has been fed into said CPU via said input device;
  in succession, computing the bounds on the states of any hidden PEs from the bounds on the input PEs and the computed bounds on the states of any hidden PEs from hidden layers of PEs closer to the input PEs; and
  computing the bounds on the states of the output PEs from the bounds on the states of the input PEs and the bounds on the states of any hidden PEs.

2. A computer-implemented process for determining when a final conclusion can be made regarding the value of an output variable in a continuous-state feedforward neural network that is stored in a computer, despite some number of unknown input states, wherein said computer comprises a CPU and an output device coupled to said CPU, said CPU comprises an inference module, and said neural network is stored within said CPU;
  said process comprising commanding the inference module to execute the steps of:
    making a tentative decision for the output variable by executing the neural network;
    determining high and low bounds on states of the output variable using the process of claim 5;
    using the high and low bounds on the output states to determine if the tentative decision for the output variable can ever change; and
    sending a signal to the output device declaring a final conclusion if the tentative decision cannot change.

3. A computer-implemented process for analyzing the operation of a continuous-state feedforward neural network that is stored in a computer, said computer comprising a CPU, said CPU comprising an inference module, an explanation module, and an intelligent knowledge acquisition module, said neural network being stored within the CPU, where the network includes a layer of input processing elements (PEs), a layer of output PEs, and any number of layers of hidden PEs, where the input PEs are representative of input variables and the output PEs are representative of output variables, said process comprising commanding the inference module to perform the steps of:
  determining a tentative decision for each output variable based upon states of the output PEs in the neural network;
  determining a final conclusion for each output variable using the process of claim 1 where, as values of input variables become known, the tentative decision eventually becomes irreversible; and
  computing confidence measures for each tentative decision and final conclusion;
commanding the explanation module to perform the steps of:
  explaining each tentative decision by computing the contribution made towards the decision by each input variable whose value is known;
  explaining each final conclusion by computing the contribution made towards reaching the conclusion by each input variable whose value is known; and
  converting knowledge implicit in the neural network into an explicit set of if-then rules; and
commanding the intelligent knowledge acquisition module to perform the step of determining potential influence on a tentative decision by each input variable whose value is unknown.

4. A computer-implemented process for determining when a final conclusion can be made regarding the value of an output variable in a continuous-state feedforward neural network that is stored in a coprocessor coupled to a digital computer, despite some number of unknown input states, wherein said coprocessor comprises a CPU and an output device coupled to said CPU, said CPU comprises an inference module, and said neural network is stored within said CPU;
  said process comprising commanding the inference module to execute the steps of:
    making a tentative decision for the output variable by executing the neural network;
    determining high and low bounds on states of the output variable using the process of claim 5;
    using the high and low bounds on the output states to determine if the tentative decision for the output variable can ever change; and
    sending a signal to the output device declaring a final conclusion if the tentative decision cannot change.

5. Apparatus for determining when a final conclusion can be made regarding the value of an output variable in a continuous-state feedforward neural network, despite some number of unknown input states, said apparatus comprising:
  a computer comprising a CPU, an input device coupled to the CPU, and an output device coupled to the CPU; wherein the neural network is fed into the CPU via the input device, and the CPU comprises an inference module comprising:
    means for making a tentative decision for the output variable by executing the neural network;
    coupled to said making means, means for determining high and low bounds on states of the output variable using the process of claim 5, wherein the process of claim 5 is executed on said CPU;
    coupled to the determining means, means for using the high and low bounds on the output states to determine if the tentative decision for the output variable can ever change; and
    coupled to the using means, means for declaring a final conclusion if the tentative decision cannot change and for sending a signal announcing the final conclusion to the output device.

6. A computer-implemented process for computing a measure of certainty for a decision corresponding to the value of an output variable in a continuous-state feedforward neural network that is stored in a computer, said computer comprising a CPU and an output device coupled to the CPU, said CPU comprising an inference module, said neural network being stored with the CPU, said process comprising directing the inference module to perform the steps of:

determining network output states given a set of input variables some of whose values are known and others of whose values are unknown;

determining upper and lower bounds on the output states using the process of claim 5;

comparing the bounds with a preselected conclusion criterion;

determining a certainty of the decision by quantitatively measuring a closeness of the bounds to the conclusion criterion; and sending a signal to the output device corresponding to said certainty.

7. A computer-implemented process for determining a minimal subset of current input values that is sufficient to support a conclusion condition in a continuous-state feedforward neural network that is stored in a computer, said computer comprising a CPU and an output device coupled to the CPU, said CPU comprising an inference module and an explanation module, said neural network being stored in said CPU, said process comprising directing the inference module to perform the steps of:

determining output states of the neural network based upon a set of input variables, some of whose values are known and others of whose values are unknown;

determining upper and lower bounds on the output states using the process of claim 5; and determining any final conclusion by comparing the bounds with a preselected conclusion criterion; and directing the explanation module to perform the steps of:

if a conclusion is possible, iteratively toggling each input variable whose value is known into an unknown condition, thereby measuring a relative importance of the toggled input variable in terms of a change in the output bounds;

defining said minimal subset to be those input variables that are just sufficient to reach the conclusion condition, filling said minimal subset with input variables in descending order of relative importance; and displaying said minimal subset on said output device.

8. A computer-implemented process for translating knowledge implicit in a continuous-state feedforward neural network stored in a computer into an explicit set of if-then rules supporting possible conclusions, said computer comprising a CPU and an output device coupled to the CPU, said neural network being stored in said CPU, said CPU comprising an explanation module, said process comprising directing the explanation module to perform the steps of:

determining output states of the neural network based upon a set of input variables, some of whose values are known and others of whose values are unknown;

determining, using the process of claim 7, a minimal subset of possible values of input variables which, if true, would result in reaching a final conclusion condition for the network, where said minimal subset of input values then constitutes a rule for said conclusion condition;

searching input values for a set of all possible rules which support said conclusion condition; and displaying said rules on said output device.

9. The process of claim 8 wherein, for any continuous-valued input variable, specific input values are chosen to be representative of upper, lower, and middle statistical regions of said variable's value range, and those values are examined for possible inclusion in a rule.

10. A computer-implemented process for explaining the reasons for a decision made by a continuous-state feedforward neural network that is stored in a computer by measuring the contribution to that decision made by each input variable having a known value, said computer comprising a CPU, an input device coupled to the CPU, and an output device coupled to the CPU;

said neural network having been fed into the CPU via the input device;

said CPU comprising an inference module and a decision explanation module;

said process comprising directing the inference module to execute the steps of:

determining network output states based upon a set of input variables that are fed into the CPU via the input device, wherein some of the values of the input variables are known and others of the values of the input variables are unknown; and determining a possibly tentative output decision by comparing the output states with a preselected decision criterion; and directing the decision explanation module to execute the steps of:

iteratively toggling each input variable that has a known value into an unknown condition, thereby measuring a relative importance of the toggled input variable in terms of a change in the output state;

ranking quantitatively the relative importance of each input variable whose value is known in determining the output decision; and displaying results of the ranking step on the output device.

11. A computer-implemented process for explaining the reasons for a final conclusion made by a continuous-state feedforward neural network that is stored in a computer, by measuring the contribution to said conclusion made by each input variable having a known value, said computer comprising a CPU, an input device coupled to the CPU, and an output device coupled to the CPU;

said CPU comprising an inference module and a conclusion explanation module;

said neural network having been fed into the CPU via the input device;

said process comprising directing the inference module to perform the steps of:

determining network output states based upon a set of input variables that are fed into the CPU via the input device, some of the values of the input variables being known and others of the values of the input variables being unknown;

determining upper and lower bounds on the output states; and determining any final conclusion by comparing the bounds with a preselected conclusion criterion; and directing the conclusion explanation module to perform the steps of:

if a conclusion is possible, iteratively toggling each input variable whose value is known into an unknown condition, thereby measuring a relative importance of the toggled input variable in terms of a change in the upper and lower output bounds;

ranking quantitatively the relative importance of each input variable whose value is known in reaching the final conclusion condition; and displaying results of the ranking step on the output device.

12. A computer-implemented process for measuring potential influence of an unknown input variable on an output decision of a continuous-state feedforward neural network stored in a computer if the value of the variable becomes known, said computer comprising a CPU and an output device coupled to the CPU, said neural network being stored in the CPU, said CPU comprising an intelligent knowledge acquisition module, said process comprising directing the intelligent knowledge acquisition module to perform the steps of:

determining output states of the neural network based upon a set of input variables, some of whose values are known and others of whose values are unknown;

for each input variable whose value is unknown, iteratively determining the change in the output states as each unknown input variable is toggled to a new known condition within its possible value range, thereby measuring a relative importance of the toggled input variable in terms of a change in the output states;

for each input variable whose value is unknown, ranking quantitatively the relative importance of each said input variable in determining the output decision; and displaying results of said ranking step on said output device.

13. A computer-implemented process for reducing computation time necessary to determine a modified output state resulting from a modified input state in a continuous-state feedforward neural network stored in a computer, said computer comprising a CPU and an input device coupled to the CPU, said neural network being stored in the CPU, said CPU comprising a module, said process comprising directing the module to perform the steps of:

determining network output states based upon a set of input variables that are fed into the CPU via the input device, wherein said neural network has at least two input processing elements, with each input variable mapped onto at least one input processing element;

changing the value of one of the input variables; and updating network output states based upon the changed input variable using only those weights associated with connections that lie in paths between input processing elements onto which the changed input variable has been mapped and any output processing element for which an updated state is desired.

* * * * *

UNITED STATES PATENT AND TRADEMARK OFFICE
CERTIFICATE OF CORRECTION

PATENT NO. : 5,398,300
DATED : March 14, 1995
INVENTOR(S) : Curt A. Levey

It is certified that error appears in the above-indentified patent and that said Letters Patent is hereby corrected as shown below:

Column 19,  Claim 2, line 16, delete "5" and insert —1—.
            Claim 3, line 18, delete "1" and insert —2—.
Column 20,  Claim 4, line 15, delete "5" and insert —1—.
            Claim 5, lines 15 and 16, delete "5" and insert —1—.
Column 21,  Claim 6, line 14, delete "5" and insert —1—.
            Claim 7, line 16, delete "5" and insert —1—.

Signed and Sealed this

Twenty-fifth Day of June, 1996

Attest:

BRUCE LEHMAN

*Attesting Officer*    *Commissioner of Patents and Trademarks*